United States Patent
Trainin et al.

(10) Patent No.: US 11,271,707 B2
(45) Date of Patent: Mar. 8, 2022

(54) IMMEDIATE RESPONSES UNDER TIME DIVISION MULTIPLEXED (TDM) ACCESS

(71) Applicant: QUALCOMM Incorporated, San Diego, CA (US)

(72) Inventors: Solomon Trainin, Haifa (IL); Amichai Sanderovich, Atlit (IL); Assaf Yaakov Kasher, Haifa (IL); Alecsander Petru Eitan, Haifa (IL)

(73) Assignee: QUALCOMM INCORPORATED, San Diego, CA (US)

( * ) Notice: Subject to any disclaimer, the term of this patent is extended or adjusted under 35 U.S.C. 154(b) by 89 days.

(21) Appl. No.: 16/254,121

(22) Filed: Jan. 22, 2019

(65) Prior Publication Data

US 2019/0229882 A1  Jul. 25, 2019

Related U.S. Application Data

(60) Provisional application No. 62/621,006, filed on Jan. 23, 2018.

(51) Int. Cl.
| | |
|---|---|
| *H04L 5/14* | (2006.01) |
| *H04L 5/00* | (2006.01) |
| *H04L 5/16* | (2006.01) |
| *H04L 1/16* | (2006.01) |
| *H04W 84/12* | (2009.01) |

(52) U.S. Cl.
CPC .............. *H04L 5/14* (2013.01); *H04L 1/1607* (2013.01); *H04L 5/0055* (2013.01); *H04L 5/16* (2013.01); *H04L 5/0023* (2013.01); *H04L 5/0082* (2013.01); *H04W 84/12* (2013.01)

(58) Field of Classification Search
CPC . H04L 5/14; H04L 5/16; H04L 1/1607; H04L 5/0055; H04L 5/0023; H04L 5/0082; H04W 84/12
See application file for complete search history.

(56) References Cited

U.S. PATENT DOCUMENTS

| | | | | |
|---|---|---|---|---|
| 5,732,077 A | * | 3/1998 | Whitehead | .......... H04W 52/286 370/349 |
| 2005/0135318 A1 | * | 6/2005 | Walton | .................... H04L 29/06 370/338 |
| 2016/0014729 A1 | * | 1/2016 | Wentink | ................ H04W 28/22 370/329 |
| 2017/0048047 A1 | | 2/2017 | Kadous et al. | |

FOREIGN PATENT DOCUMENTS

WO    WO-2017196968 A1    11/2017

OTHER PUBLICATIONS

Kedem et al., Beamforming for mmWave Distributed Network, IEEE, Jan. 16, 2018 (Year: 2018).*

(Continued)

*Primary Examiner* — Justin T Van Roie
(74) *Attorney, Agent, or Firm* — Patterson+ Sheridan, L.L.P.

(57) ABSTRACT

Certain aspects of the present disclosure provide methods and apparatus for accommodating immediate response to frames transmitted under time division multiplexed (TDM) access. Certain aspects of the present disclosure also provide methods and apparatus for indicating a frame is transmitted under time division multiplexed (TDM) access.

30 Claims, 21 Drawing Sheets

(56) References Cited

OTHER PUBLICATIONS

Cherian G., et al., "Ack/BA for mmWave Distribution Networks", IEEE Draft; 11-17-1647-00-00AY-ACK-BA-FOR-MMWAVE-Distribution-Networks, IEEE-SA Mentor, Piscataway, NJ, USA, vol. 802.11 ay, Nov. 6, 2017, XP068122358, Retrieved from the Internet: URL:https://mentor.ieee.org/802.11/dcn/17/11-17-1647-00-00ay-ack-ba-for-mmwave-distribution-networks.pptx [retrieved on Nov. 6, 2017], pp. 1-12.
ERICSSON: "On the Number of HARQ processes", 3GPP Draft; R1-167053, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016), XP051140522, Retrieved from the Internet: URL:http://www.gpp.org/ftp/Meetings_3GPP_SYNC/RAN1/Docs/ [retrieved on Aug. 21, 2016], 1 page.
Partial International Search Report—PCT/US2019/014665—ISA/EPO—Apr. 18, 2018.
International Search Report and Written Opinion—PCT/US2019/014665—ISA/EPO—Jul. 25, 2019.

\* cited by examiner

| Bits 0–13 | Bit 14 | Bit 15 | Usage |
|---|---|---|---|
| 0–32 767 | | 0 | Duration value (in microseconds) within all frames except:<br>– PS-Poll frames transmitted during the CP<br>– frames transmitted during the CFP using the HCF |
| 0–16383 | 0 | 1 | Indicates TDM access |
| | 1 | 1 | Reserved |
| 0 | 1 | 1 | Reserved |
| 1–2007 | 1 | 1 | AID in PS-Poll frames. |
| 2008–16 383 | 1 | 1 | Reserved |

FIG. 12A

| Bits 0–13 | Bit 14 | Bit 15 | Usage |
|---|---|---|---|
| 0–32 767 | | 0 | Duration value (in microseconds) within all frames except:<br>– PS-Poll frames transmitted during the CP<br>– frames transmitted during the CFP using the HCF |
| 0 | 0 | 1 | Fixed value under point coordination function (PCF) within Frames transmitted during CFP. |
| 0–16 383 | 0 | 1 | Reserved |
| 0 | 1 | 1 | Indicates TDM access |
| 1–2007 | 1 | 1 | AID in PS-Poll frames. |
| 2008–16 383 | 1 | 1 | Reserved |

FIG. 12B

IMMEDIATE RESPONSES UNDER TIME DIVISION MULTIPLEXED (TDM) ACCESS

CLAIM OF PRIORITY UNDER 35 U.S.C. § 119

The present Application for patent claims benefit of U.S. Provisional Patent Application Ser. No. 62/621,006, filed Jan. 23, 2018, assigned to the assignee hereof and hereby expressly incorporated by reference herein.

BACKGROUND

Field of the Disclosure

Certain aspects of the present disclosure generally relate to wireless communications and, more particularly, to distribution networks that utilize point-to-point communication between devices.

Description of Related Art

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard, may support such high data rates. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example, arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a first frame a first interface configured to output the first frame for transmission to a wireless node during a first service period used for simplex communications from the apparatus node to the wireless node, and a second interface configured to monitor, during a second service period used for simplex communications from the wireless node to the apparatus, for a second frame from the wireless node acknowledging receipt of the first frame.

Certain aspects of the present disclosure provide an apparatus for wireless communications. The apparatus generally includes a first interface configured to obtain a first frame from a wireless node during a first service period used for simplex communications from the wireless node to the apparatus, a processing system configured to generate a second frame acknowledging the first frame, and a second interface configured to output the second frame for transmission to the wireless node during a second service period used for simplex communications from the apparatus to the wireless node.

Certain aspects of the present disclosure provide an apparatus for wireless communications. The apparatus generally includes a processing system configured to generate a first frame for transmission to a first wireless node in a first network, the first frame having a duration field set to provide an indication the apparatus is operating in a time division duplexing (TDD) channel access mode, and a first interface configured to output the first frame for transmission to the first wireless node during a first service period used for simplex communications from the apparatus to the first wireless node while the apparatus is operating in the TDD channel access mode.

Certain aspects of the present disclosure provide an apparatus for wireless communications. The apparatus generally includes obtaining a first frame having a duration field and a processing system configured to determine, based on the duration field, that a wireless node that transmitted the first frame is operating in a time division duplexing (TDD) channel access mode and to take one or more actions based on the determination.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a diagram of an example wireless communications network, in accordance with certain aspects of the present disclosure.

FIGS. 12A and 12B illustrate example options for indicating TDM access, in accordance with certain aspects of the present disclosure.

DETAILED DESCRIPTION

Figure 1:
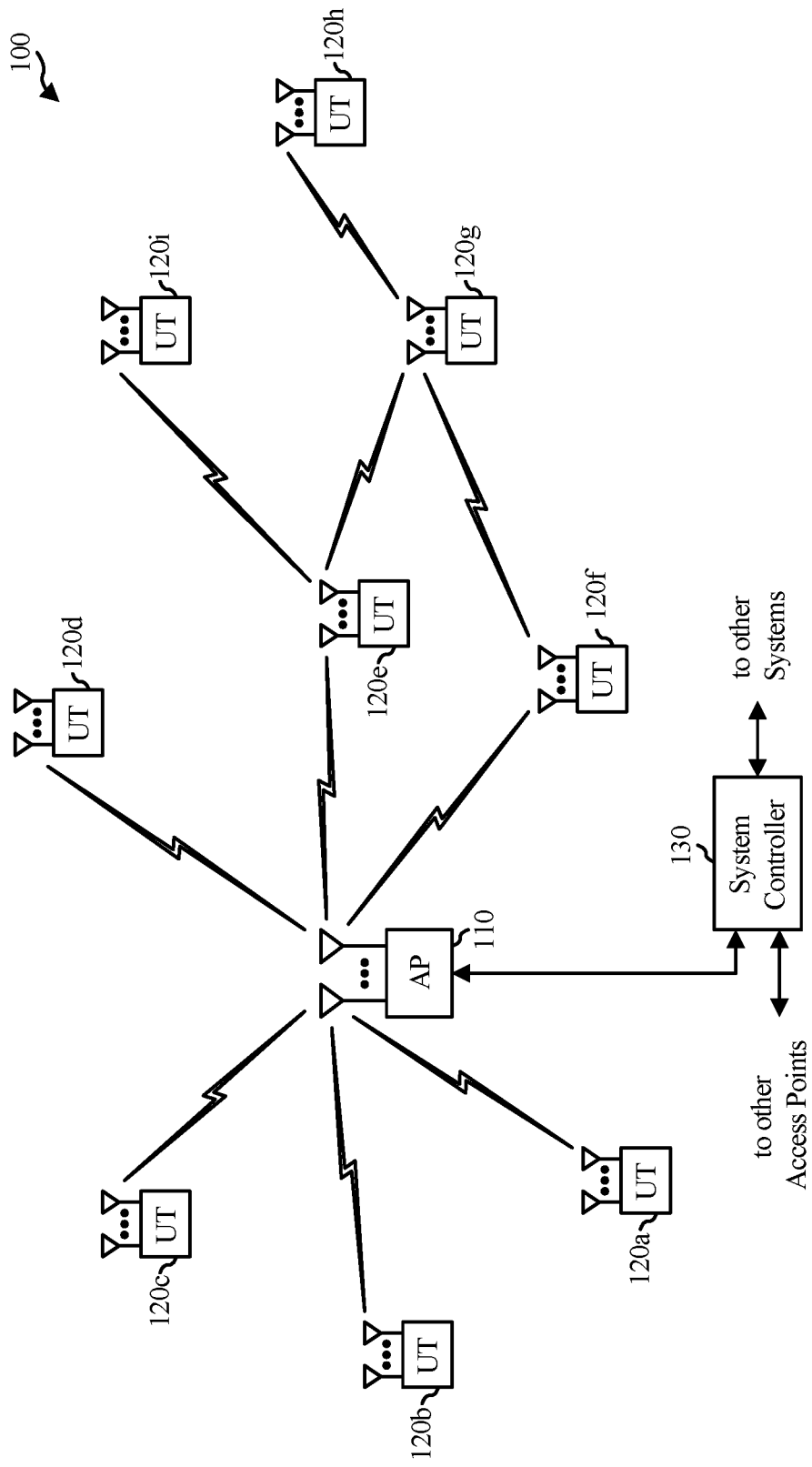

Certain aspects of the present disclosure provide methods and apparatus for performing positioning based on directional transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC- FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smartphone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such a wireless node may provide, for example, connectivity for or to a network (e.g., a wide area network such as the Internet or a cellular network) via a wired or wireless communication link.

FIG. 1 illustrates a multiple-access multiple-input-multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas for sending downlink transmissions and for receiving uplink transmissions. A set of K selected user terminals 120 collectively may be intended recipients of the downlink transmissions and sources of uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using the TDMA technique, different code channels with code-division multiple access (CDMA), disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
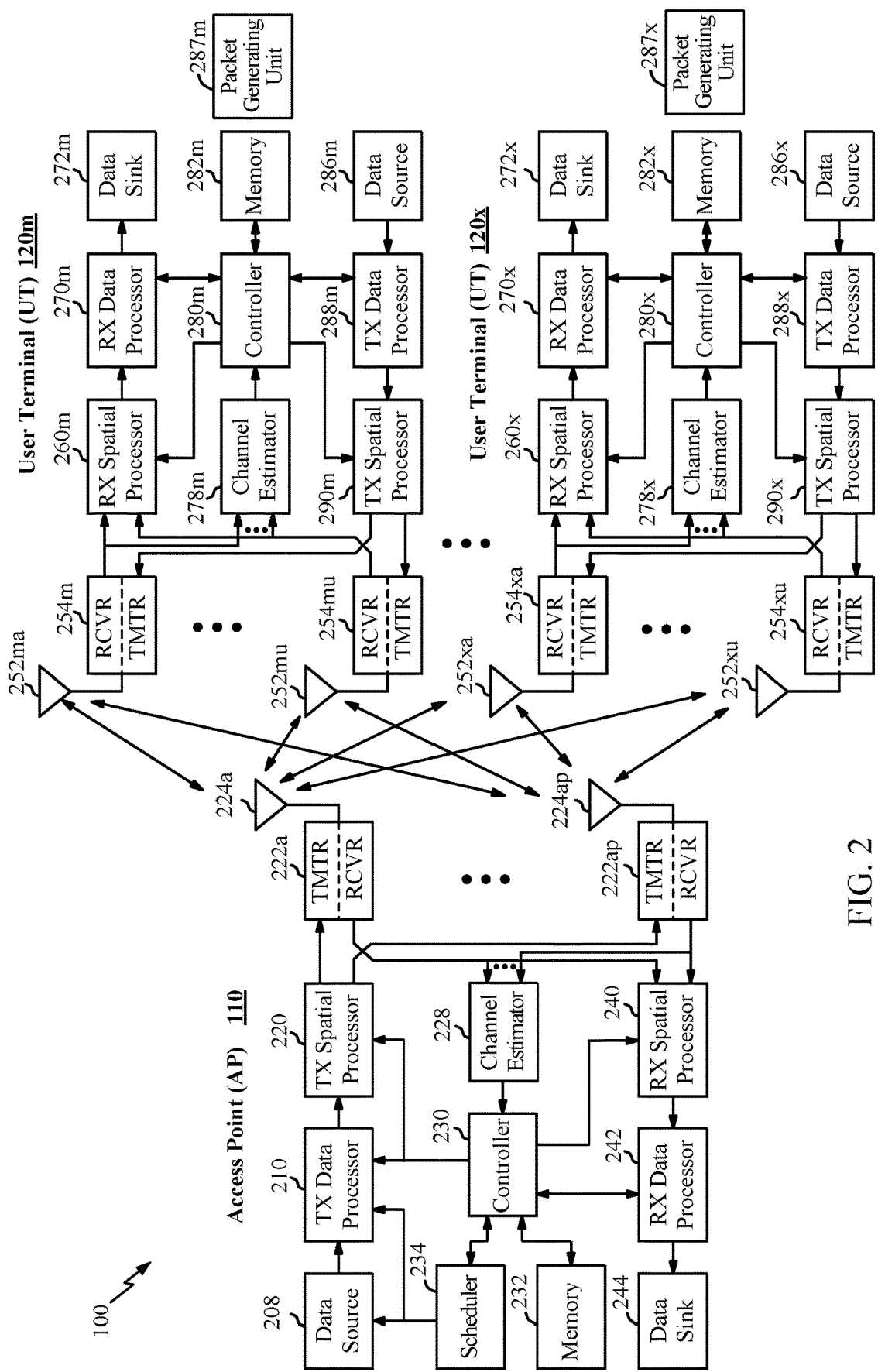
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected to receive simultaneous transmissions on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, de-interleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120 (120m ... 120x), $N_{ut}$ antennas 252 (252ma-252mu for user terminal 120m and 252xa-252xu for user terminal 120x) receive the $N_{ap}$ downlink signals from access point 110, where the value of $N_{ut}$ may differ for user terminals 120m and 120x. Each receiver unit 254 processes a received signal from an associated antenna 252 and provides a received symbol stream. An RX spatial processor 260 performs receiver spatial processing on $N_{ut}$ received symbol streams from $N_{ut}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, signal-to-noise ratio (SNR) estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example, arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
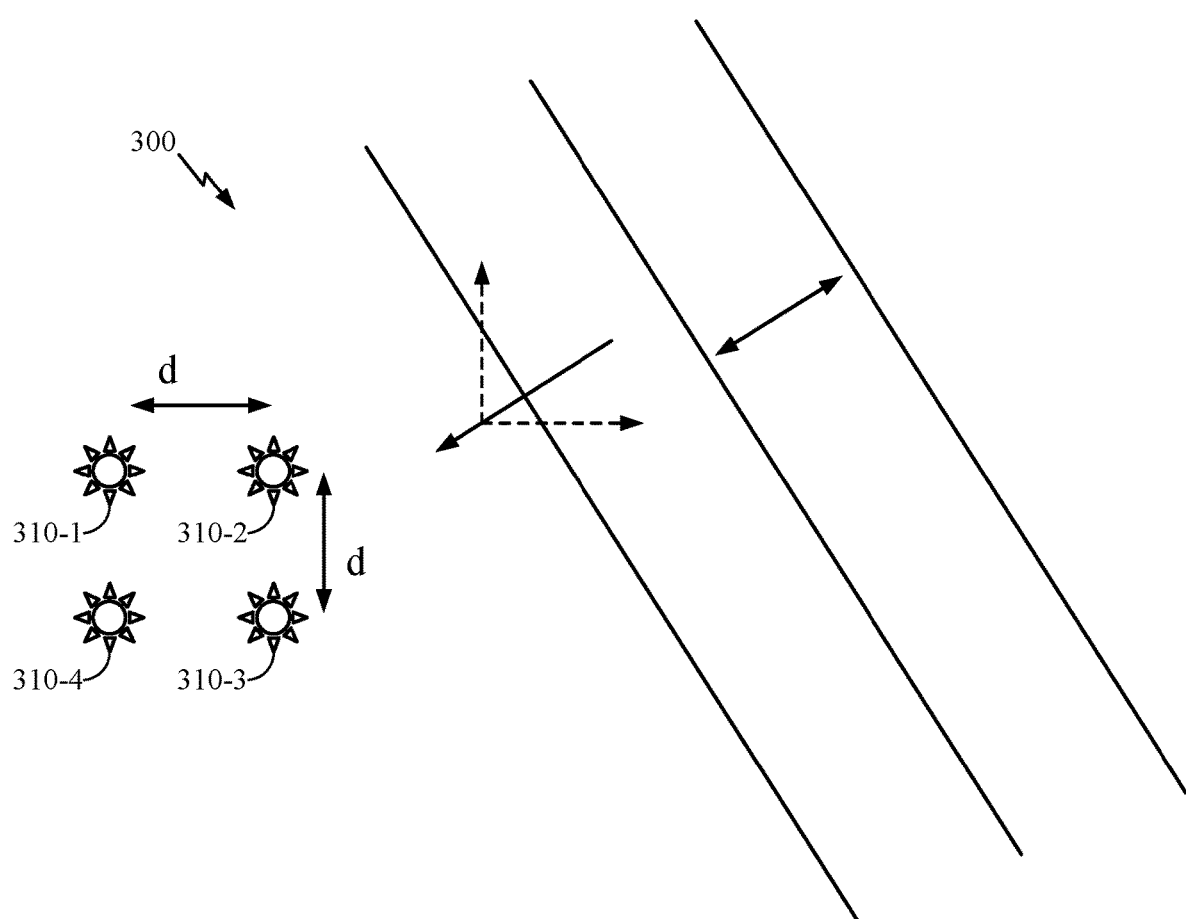
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

Example of Distribution Network in 60 GHz Spectrum

Aspects of the present disclosure provide techniques for providing secure network and association services to allow a device to join a distribution network (DN). The techniques may also provide information used to communicate in the distribution network, such as scheduling and clock offset information.

The techniques presented herein may allow for the implementation of DNs in the 60 GHz spectrum. Such implementations may include features such as, for example, scheduled access to mitigate interference. Such scheduled access may be provided by allocating service periods in which devices communicate via simplex communication. As used herein, the term service period (SP) generally refers to a period a station is awake and capable of receiving or transmitting frames. Simplex communication generally refers to communications via a channel that sends information in one direction only at a time. Full-duplex communication generally refers to communications in which two entities can communicate with each other simultaneously. Half-duplex communication generally refers to communications in which each entity can communicate with another but two devices cannot communicate simultaneously. In some cases, a simplex communications channel that operates in one direction at a time may be reversible, such that it is may be considered half-duplex.

Aspects of the present disclosure may provide DN support, for example, in a system in-line with an 802.11 standard for 60 GHz spectrum that currently lacks any such feature. Aspects of the present disclosure may provide secure network association services to a device seeking to join a DN and subsequent allocation of SPs to communicate between nodes in the DN to eliminate interference (e.g., using simplex communication).

Figure 4:
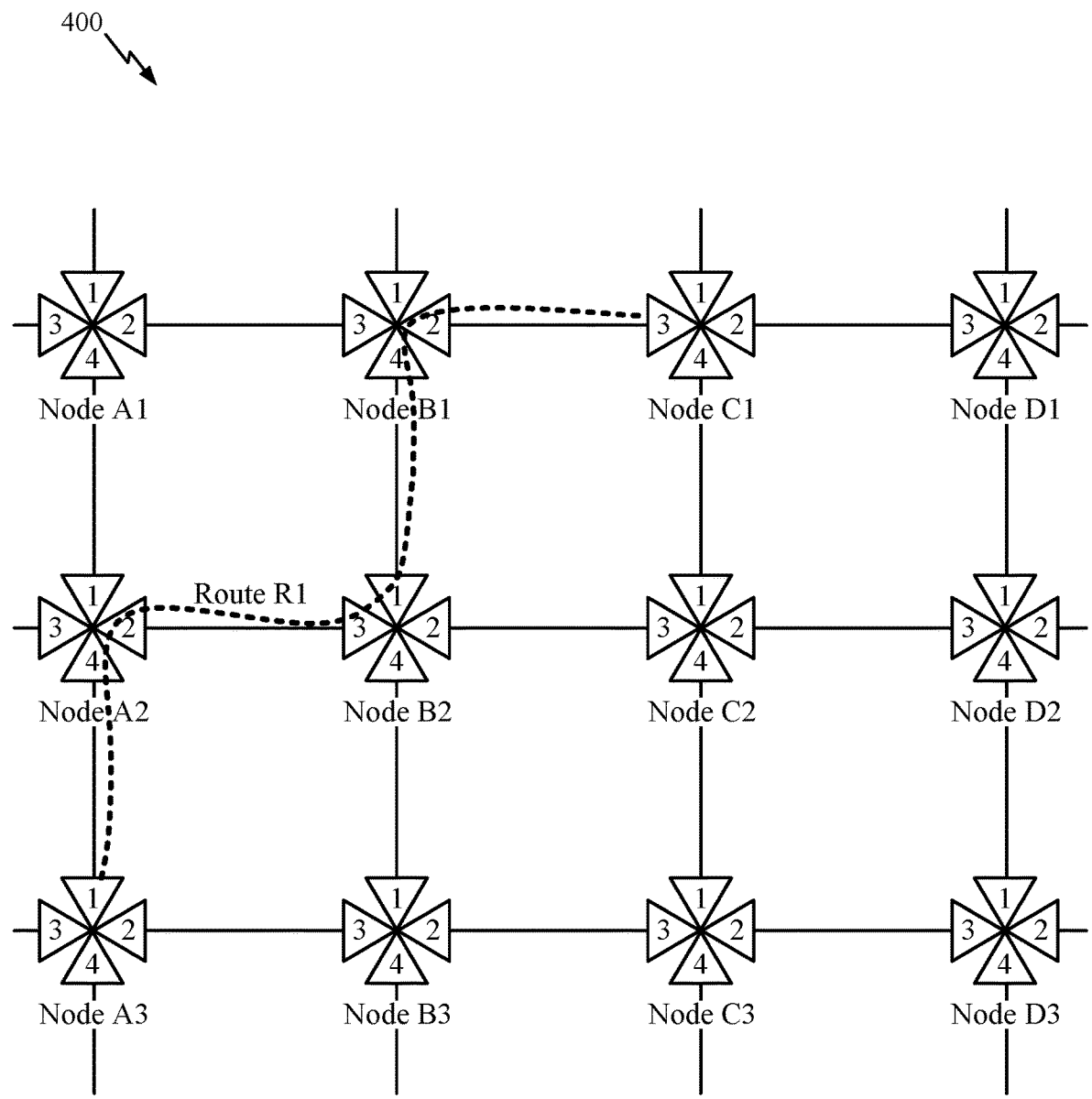
FIG. 4 illustrates an example of a distributed network in which aspects of the present disclosure may be practiced.

As illustrated in FIG. 4, a DN 400 may be formed by DN nodes that each contain one or more non-AP STAs. The DN nodes may communicate using point-to-point (e.g., 802.11ad) links between stations (STAs). Routing functions may be provided by protocols above a logical link control (LLC) level.

In the example illustrated in FIG. 4, DN 400 includes Nodes A1-D3. In DN 400, each node contains 4 stations STA1, STA2, STA3, and STA4 (1-4). The stations may be oriented to optimize communications in a given direction, with the group of stations providing collective "omnidirectional" coverage. The STAs may have physical or virtual instantiation. Physical instantiation generally means that the STAs may have separate hardware components and physical resources. Virtual instantiation generally means that the STAs may share resources as virtual STAs. Each STA may have its own MAC address locally or globally administered. The routing functionality may be provided by mapping IP addresses to MAC addresses.

As illustrated, in some cases, only one STA of each Node may be used to connect to any one other Node. For example, STA2 of Node A1 is used to connect to STA3 of Node B1, while STA4 of Node A1 is used to connect to STA1 of Node A2. STAs not connected to another node may act as an access point. For example, the STAs not connected to another node may provide secure network association services to joining nodes.

In some cases, a route used for communication between two end Nodes may use one or more devices to cross as few other Nodes in the DN 400. For example, as shown, a Route R1 may be provided that crosses Nodes A2, B2, B1 to communicate Node A3 with Node C1. Each node may provide layer 3 routing to communicate between endpoints. DN timing may be synchronized in any suitable manner, for example, via a global position system (GPS) or some other type of independent clock source.

Example Immediate Responses Under TDM Access

Aspects of the present disclosure may provide an immediate response (e.g., acknowledgment) mechanism for devices in a Distribution (or Distributed) Network under time division multiple (TDM) access, in which each device is allocated a time slot for communicating.

An immediate response is a feature in wireless networks, such as IEEE 802.11 standards compliant networks, that provide a carrier sense medium access/collision avoidance (CSMA/CA) solution. One purpose of the immediate response is to provide feedback and assurance to an initiator of a link access that transmits a frame (to a responder) that the sent frame is acknowledged and that the acknowledgment arrives in a predicted time. This feature is used by CSMA/CA to mitigate collision by retransmission of any unacknowledged frames.

The immediate response behavior is typically governed by a set of related rules:
(i) No more than one MAC service data unit (MSDU) with a particular individual RA is allowed to be outstanding at a time;
(ii) Response timeout event is used to detect if an expected response arrives and retransmission is triggered if not;
(iii) The response and forthcoming transmissions and responses, if any, are protected from interference of other devices' transmission' by assertion of a network allocation vector (NAV) with a value that is delivered in Duration field of the communicating frames.

There are also a set of time intervals defined for different types of transmission/responses:
(i) The short interframe space (SIFS) refers to the time from the end of the last symbol, or signal extension if present, of the previous frame to the beginning of the first symbol of the preamble of the subsequent frame. The SIFS shall be used prior to transmission of an Ack frame, a clear to send (CTS) frame, a PPDU containing a BlockAck frame that is an immediate response to either a BlockAckReq frame or an aggregate MAC protocol data unit (A-MPDU), a directional multi-gigabit (DMG) CTS frame, a DMG DTS frame, a Grant Ack frame, a response frame transmitted in the announcement transmission interval (ATI).
(ii) The beam refinement protocol (BRP) interframe space (BRPIFS) is used by STAs between transmissions of BRP frames. The BRPIFS is the maximum time from the end of the last symbol of the previous PLCP Protocol Data Unit (PPDU), or training field if present in the PPDU, to the beginning of the first symbol of the preamble of the subsequent PPDU. The corresponding minimum time is SIFS.
(iii) The medium beamforming interframe space (MBIFS) is used between the beacon transmission interval (BTI) and the association beamforming training (A-BFT) and between the initiator sector sweep (ISS), responder sector sweep (RSS), sector sweep feedback (SSW-Feedback), and SSW-Ack. MBIFS may be equal to 3×aSIFSTime.

A time division multiplexing (TDM) scheme in the 802.11ay standard may attempt to reuse as many possible mechanisms and rules defined in previous (e.g., 802.11) standards. The TDM access schedules sequence of service periods that each is used for simplex transmission so, the immediate response as it is defined in 802.11 is not applicable. The TDM access is also substantially different from the CSMA/CA access such that the known mechanisms of carrier sense may not be used at all (as each time slot is dedicated for simplex communications between a pair of devices).

Even though mechanisms like carrier sense may not be applicable for TDM access itself, it may be beneficial to support, or at least partially support, such mechanisms to help cases where TDM access networks and CSMA/CA networks overlap. For example such mechanisms may help cases where TDM access networks and CSMA/CA networks overlap to at least to be aware of channels occupied by the TDM access.

Aspects of the present disclosure provide an immediate response mechanism that may be applicable to TDM. Certain aspects also provide a timeout rule, duration field decoding mechanism, and retransmission rule that may be applicable for the TDM access. In general, CSMA specific time intervals Point coordination function (PCF) inter-frame space (PIFS), Distributed coordination function (DCF) inter-frame space (DIFS), arbitration inter-frame space (AIFS), and extended inter-frame space (EIFS) may not be used under TDMA access. However, immediate response rules of transmission and retransmission based on time intervals of SIFS and MBIFS are redefined for TDMA access. Values in the duration field and NAV assertion rules are also provided, including a mechanism for providing an indication of TDM access in the frames.

Figure 5:
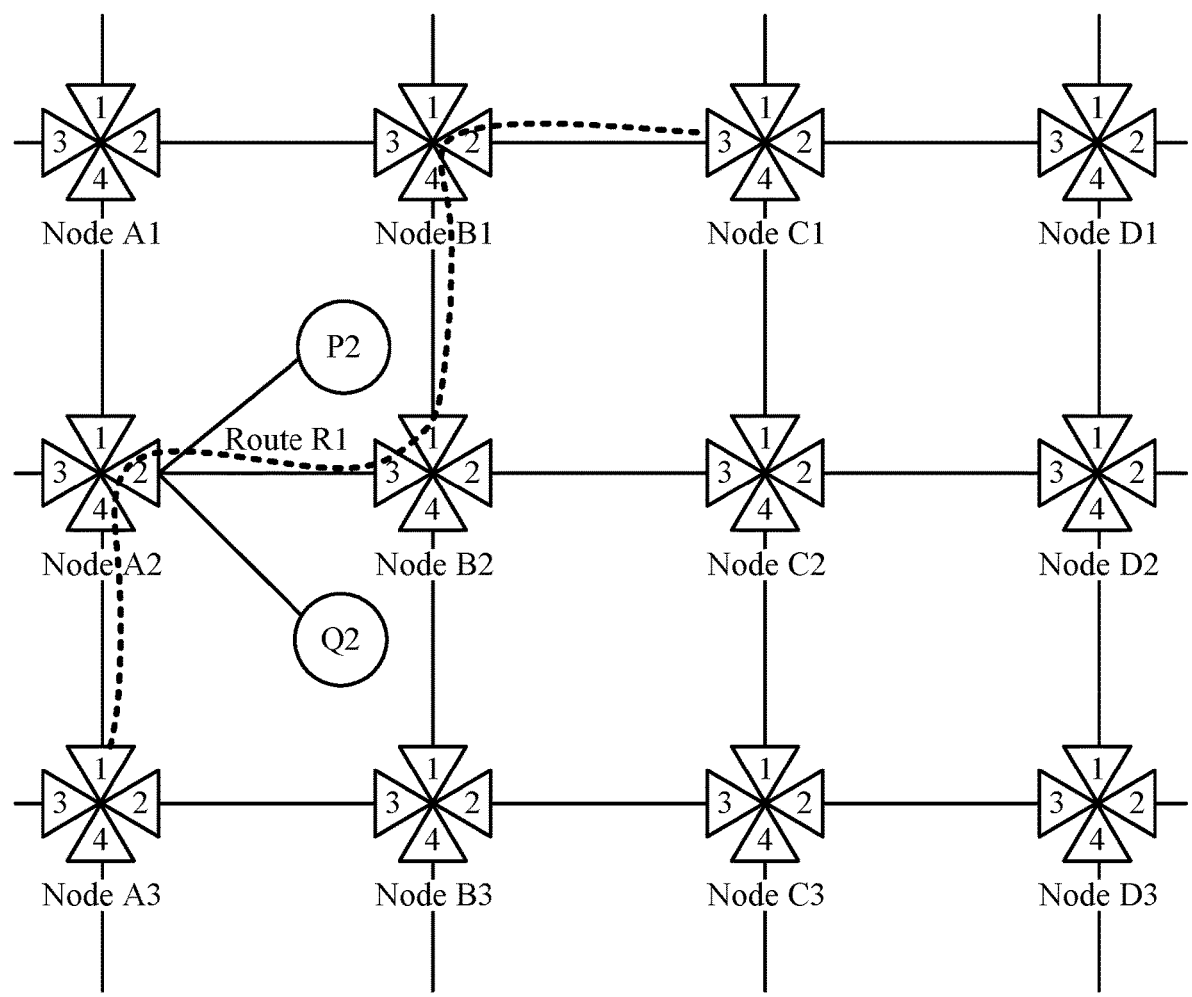
FIG. 5 illustrates an example distributed network topology in which aspects of the present disclosure may be practiced.

FIG. 5 illustrates a topology of a DN network that may exploit TDM access. Nodes of the network may have few instances of MAC and PHY that serve as directed antenna. The TDM access may apply to point to point delivery, for example, where station entity 2 of node A2 may communicate with nodes P2, Q2, and station entity 3 of the Node B2 by sharing time of transmission and receiving among the nodes. In parallel, the station entity 4 of the Node A2 may communicate with station entity 1 of the Node A3.

Figure 6:
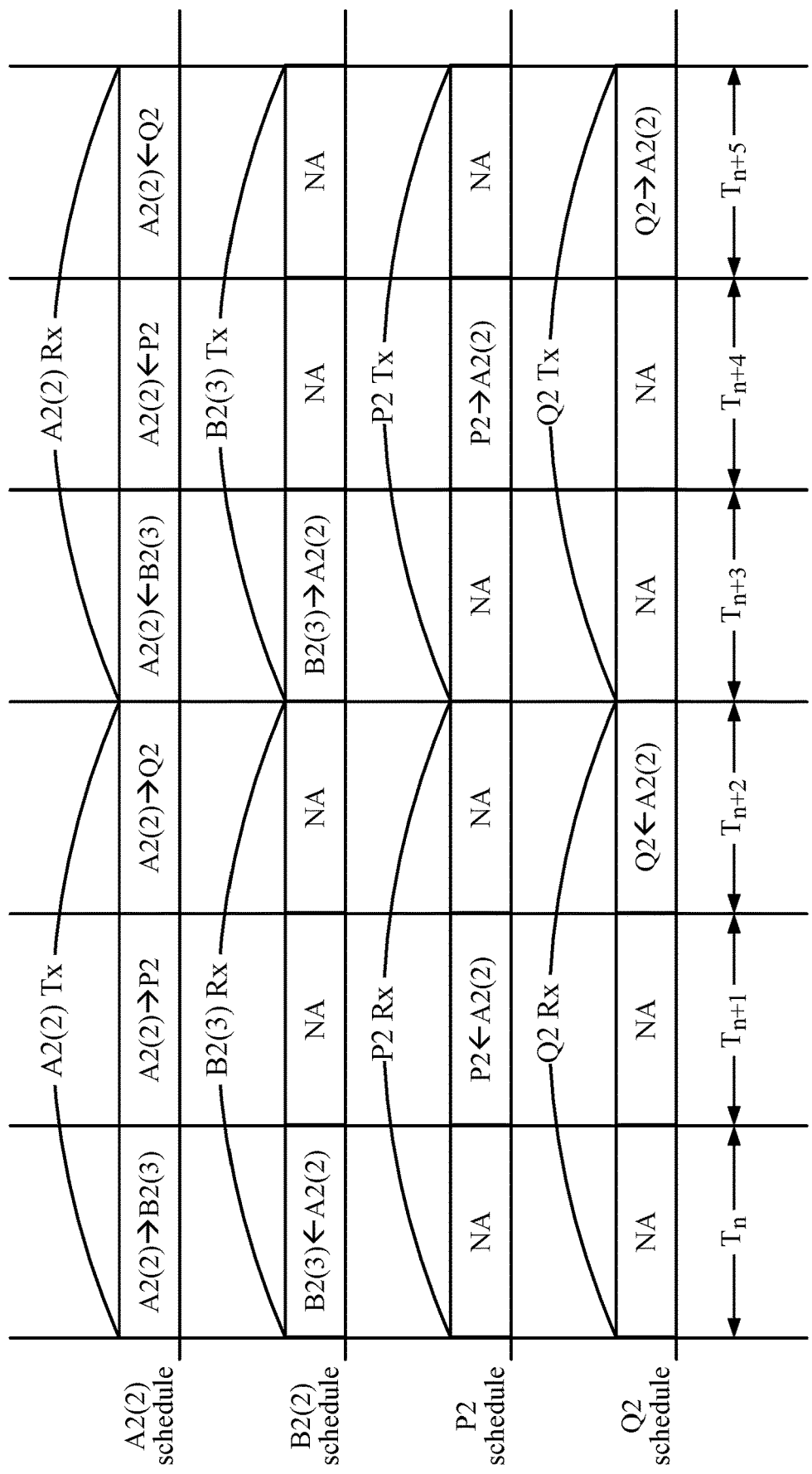
FIG. 6 illustrates an example schedule for time division multiplexed (TDM) access for the distributed network topology of FIG. 5.

FIG. 6 illustrates an example TDM schedule of Node A2(2) for communicating with Node B2 (3) and nodes P2 and Q2. Time intervals allocated for Node A2(2) transmission to the Node B2(3) are allocated for Node B2(3) to receive from Node A2(2) and vice versa. Time intervals allocated for the Node A2(2) communication with the Nodes P2 and Q2 cannot be used for communication with B2(3).

As noted above, aspects of the present disclosure provide an immediate response mechanism that may be applicable for TDM access, such as that shown in FIGS. 5 and 6.

Figure 7:
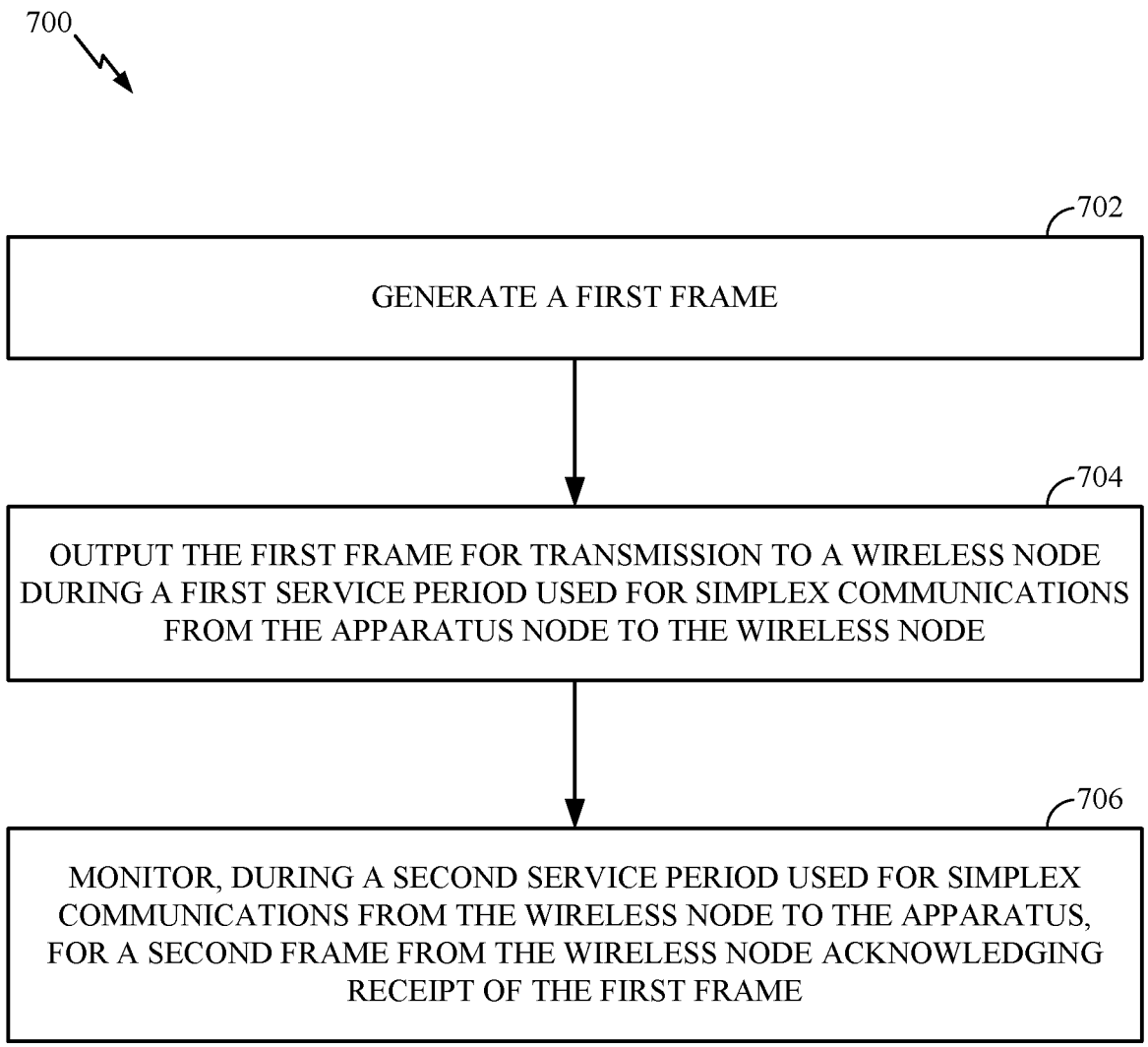
FIG. 7 illustrates an example of example operations for sending a frame with immediate response, in accordance with certain aspects of the present disclosure.
Figure 7A:
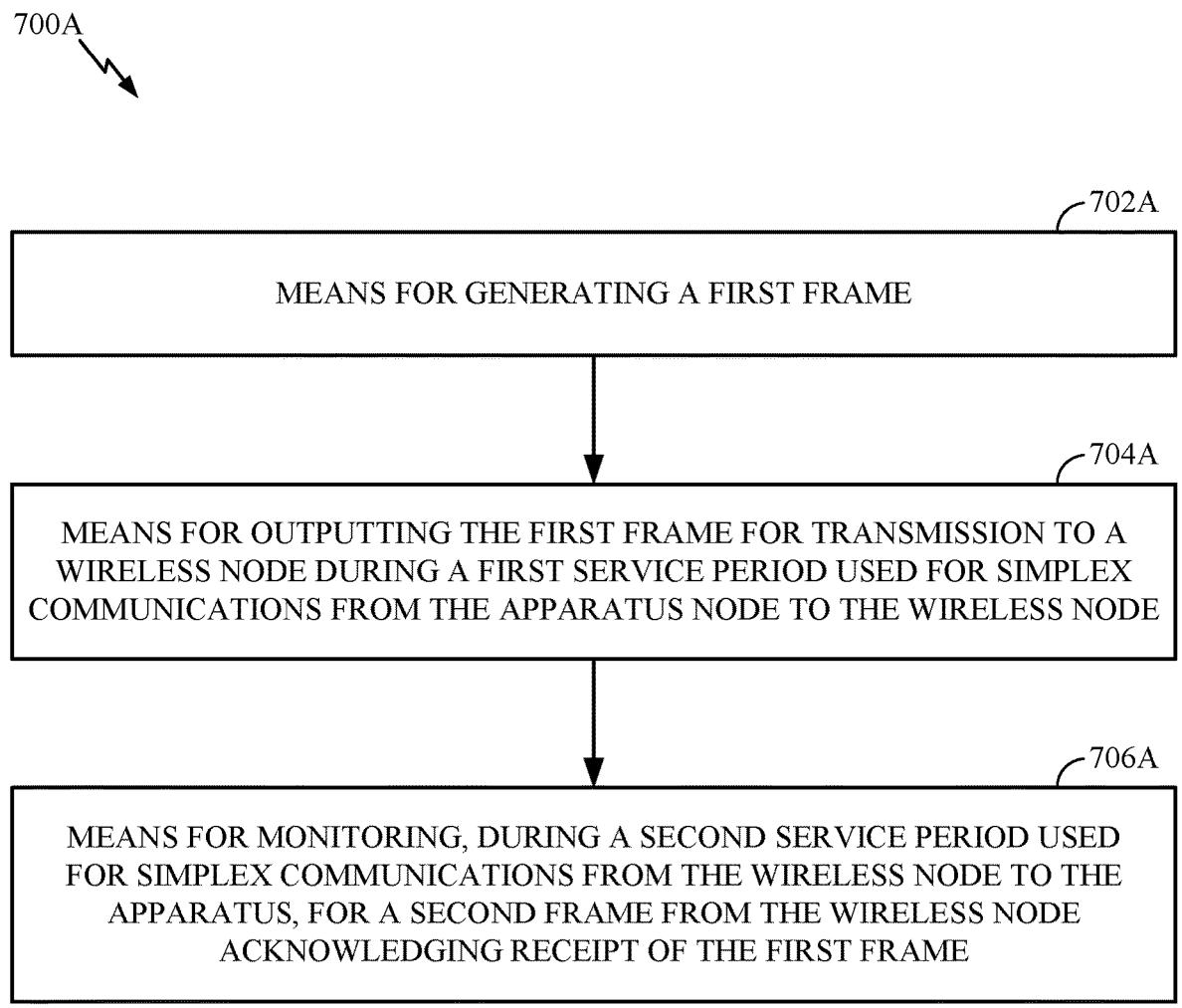
FIG. 7A illustrates example components capable of performing the operations shown in FIG. 7.

FIG. 7 illustrates example operations 700 that may be performed by a device seeking to send a frame for immediate response in a DN under TDM access. Operations 700 may be performed, for example, by an STA of a DN node.

Operations 700 begin, at 702, by generating a first frame. At 704, the first frame is output for transmission to a wireless node during a first service period used for simplex communications from the apparatus node to the wireless node. At 706, the apparatus monitors, during a second service period used for simplex communications from the wireless node to the apparatus, for a second frame from the wireless node acknowledging receipt of the first frame. In some cases, the first interface is configured to output the first frame for transmission to the wireless node during the slot without regard to a busy or an idle state of the medium.

Figure 8:
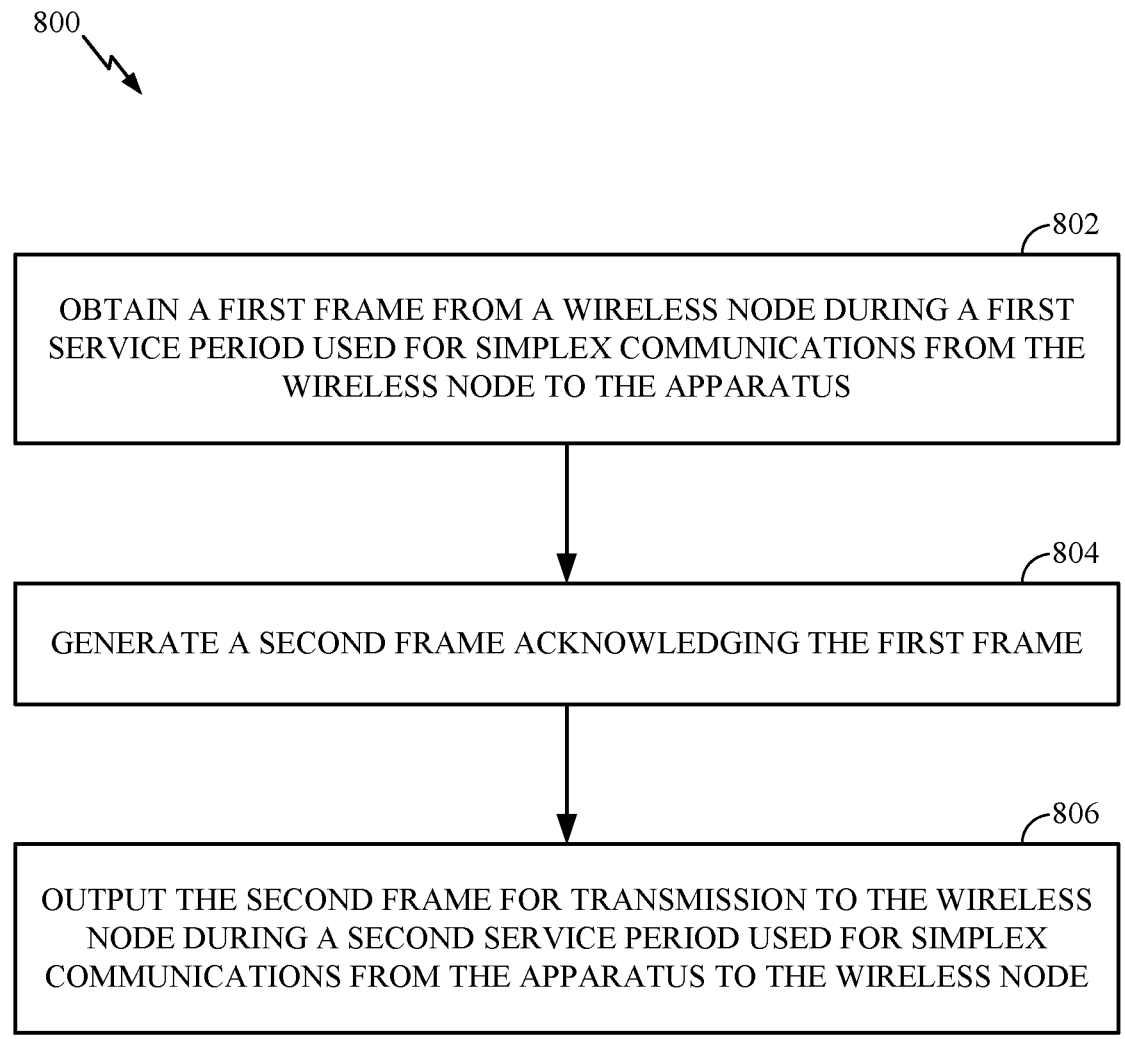
FIG. 8 illustrates an example of example operations for processing a frame with immediate response, in accordance with certain aspects of the present disclosure.
Figure 8A:
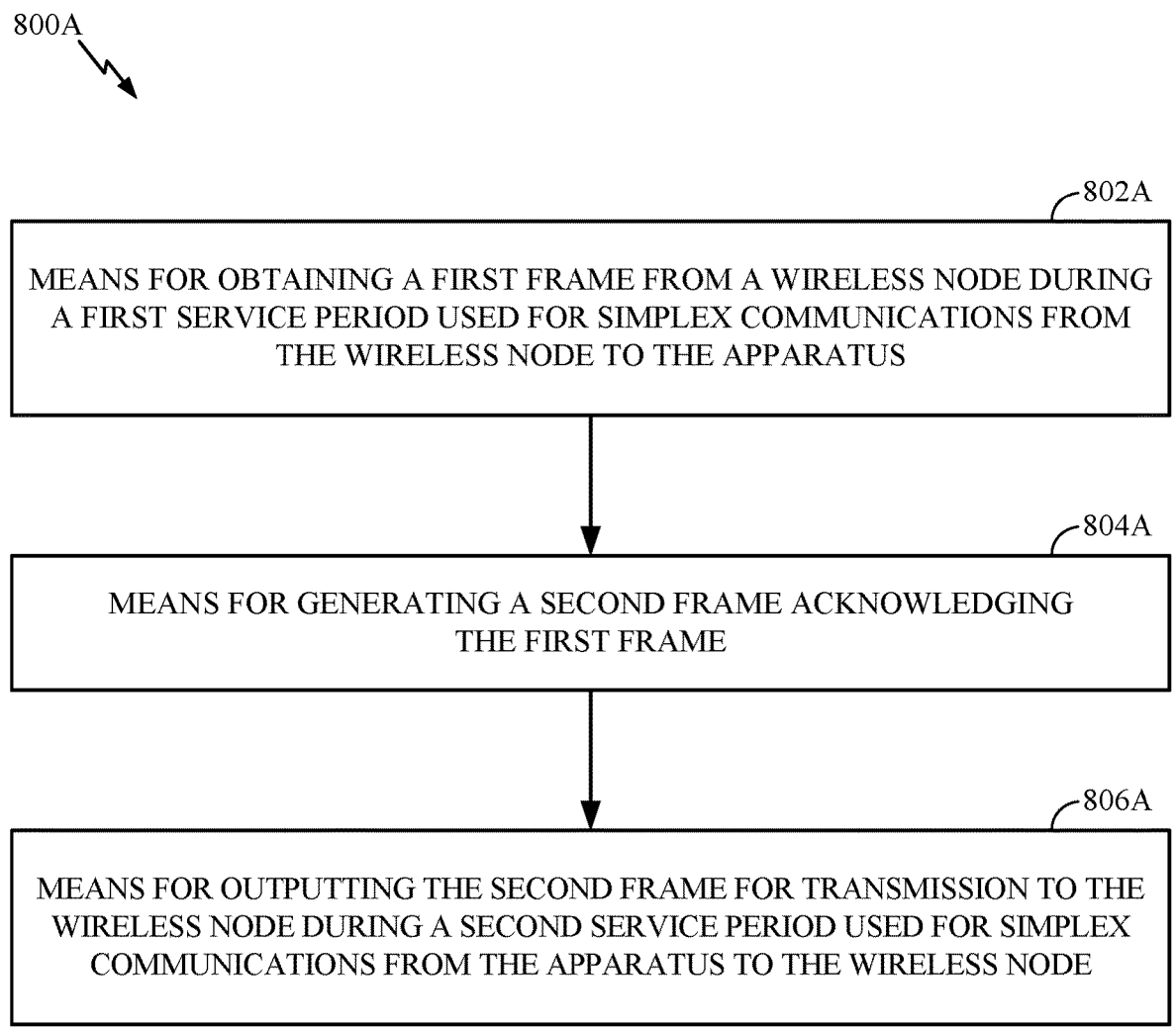
FIG. 8A illustrates example components capable of performing the operations shown in FIG. 8.

FIG. 8 illustrates example operations 800 that may be performed by a device processing a frame sent for immediate response in a DN under TDM access. Operations 800 may be performed, for example, by a device communicating with another device performing operations 700 described above.

Operations 800 begin, at 802, by obtaining a first frame from a wireless node during a first service period used for simplex communications from the wireless node to the apparatus. At 804, the apparatus generates a second frame acknowledging the first frame. At 806, the apparatus outputs the second frame for transmission to the wireless node during a second service period used for simplex communications from the apparatus to the wireless node.

Figure 9:
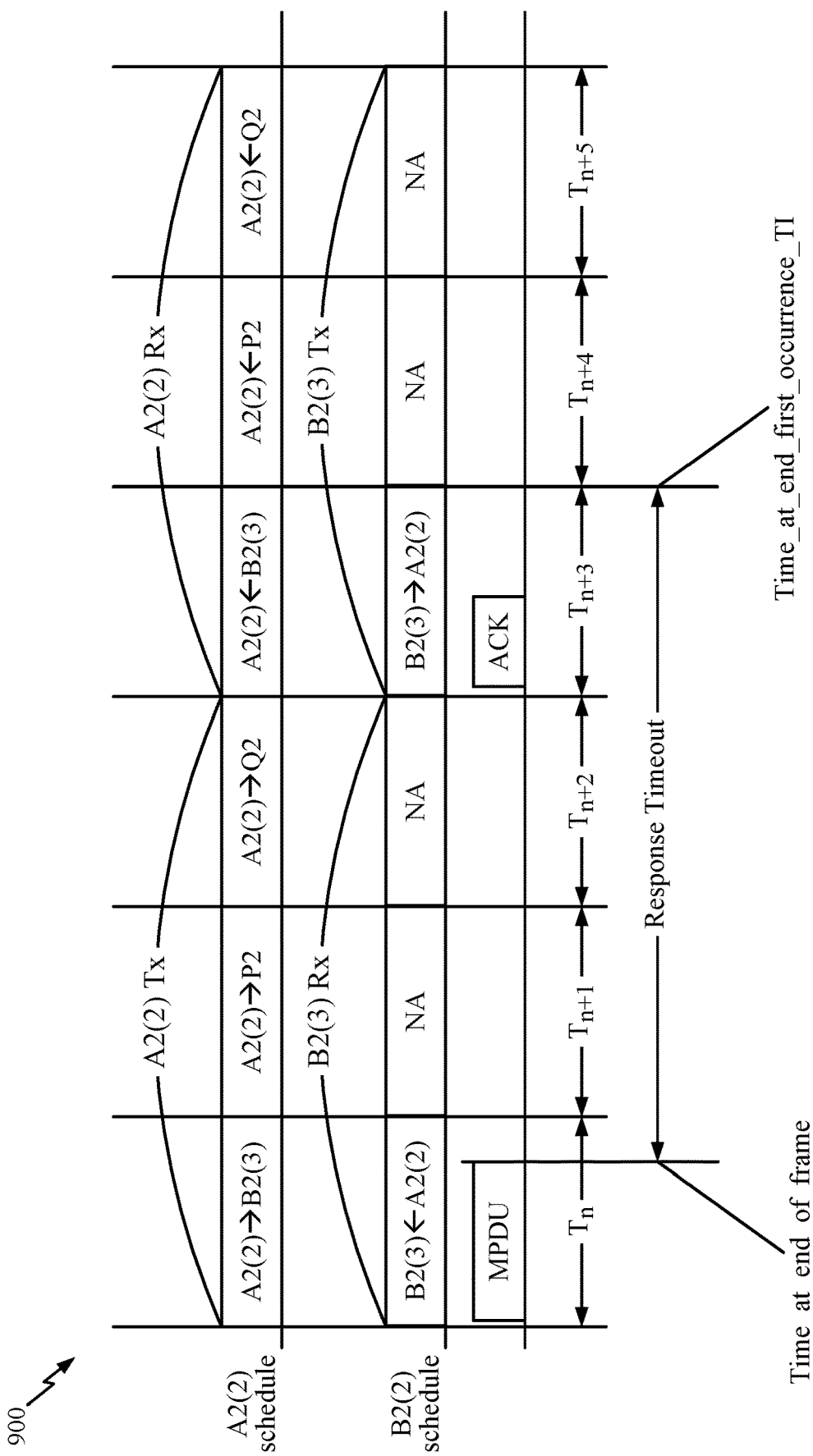
FIG. 9 illustrates an example schedule for immediate response under time division multiplexed (TDM) access, in accordance with certain aspects of the present disclosure.

FIG. 9 illustrates an example of frame transmission and acknowledgment under TDM access, in accordance with aspects of the present disclosure. In the illustrated example, the Node A2(2) transmits an MPDU that the Node B2(3) receives in service period (SP) $T_n$. The Node B2 (3) then responds with an acknowledgment (ACK) to the Node A2 (2) in SP $T_{n+3}$, a first occurring slot which is a first occurrence (tile/slot) to transmit from the Node B2 (3) to the Node A2 (2).

Transmission rules for immediate response under TDM access may be summarized as follows. For frames that are not sent within the context of a block acknowledgment (BA) agreement, a STA may not be allowed more than one frame (from an initiator to a particular individual responder) outstanding at any time. As used herein, the term outstanding generally refers to a frame for which transmission has been started, and for which delivery has not yet been completed (e.g., an acknowledgment of the frame has not been received and the frame has not been discarded due to retries, lifetime, or for some other reason).

A duration of multiple frames required in response to the frames transmitted by an initiator may not be allowed to exceed a time allocated in the TDM schedule at a first occurrence of transmission from the responder to the initiator. In other words, an immediate response in the context of TDM may be considered a response in the first allocated opportunity for a responder to transmit to the initiator. Referring again to FIG. 9, if Node A2(2) sent an MPDU (with immediate response) to P2 in $T_{n+1}$, P2 would send an ACK in $T_{n+4}$. Similarly, if Node A2(2) sent an MPDU (with immediate response) to Q2 in $T_{n+2}$, Q2 would send an ACK in $T_{n+5}$.

In one TDM time interval, an initiator may transmit multiple frames that require different response types. These different response types, for example, may include an ACK frame, BlockAck (TID) frame, Grant ACK frame, and immediate response for request there no ACK is required.

The initiator may not be allowed to transmit frames that require more than one response of the same type. For example, the initiator may be allowed only one frame that requires Ack frame response, and one set of MPDUs that requires BlockAck of specific TID.

Retransmission rules may also be described with reference to FIG. 9. The Initiator may retransmit frame if it does not get an expected response at the time a ResponseTimeout expires. As illustrated in FIG. 9, for each frame transmitted by the Initiator the ResponseTimeout is computed as:

$$\text{Time\_at\_end\_first\_occurrence\_TI} - \text{Time\_at\_end\_of\_frame}$$

In some cases, it may be desirable for devices to be aware that a frame is sent as under TDM access. For example, it may be desirable for devices in an overlapping basic service set (OBSS) to know devices are operating under TDM access for interference avoidance or mitigation purposes. In some cases, a duration field may be encoded to provide an indication a frame is sent by a device operating under TDM access.

Figure 10:
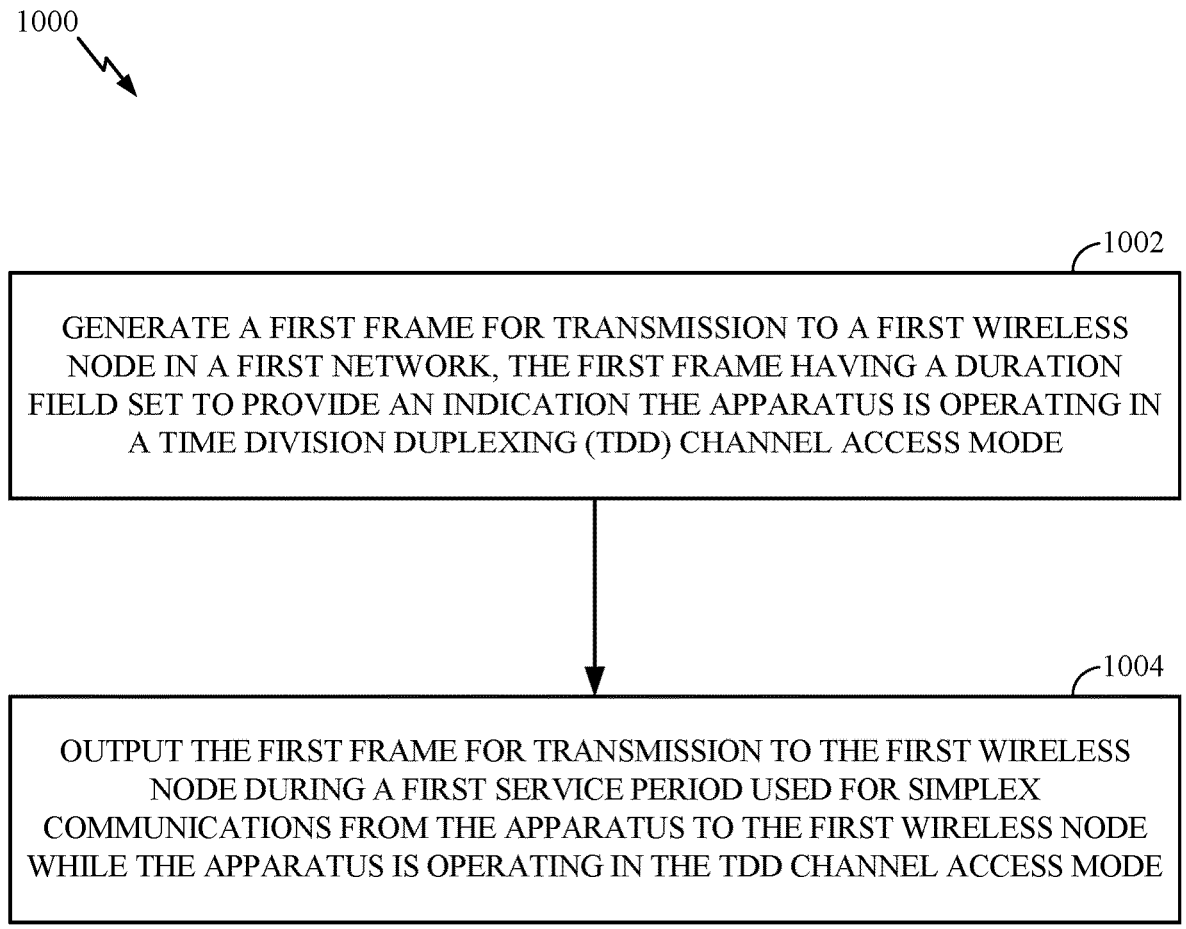
FIG. 10 illustrates an example of example operations for indicating TDM access, in accordance with certain aspects of the present disclosure.
Figure 10A:
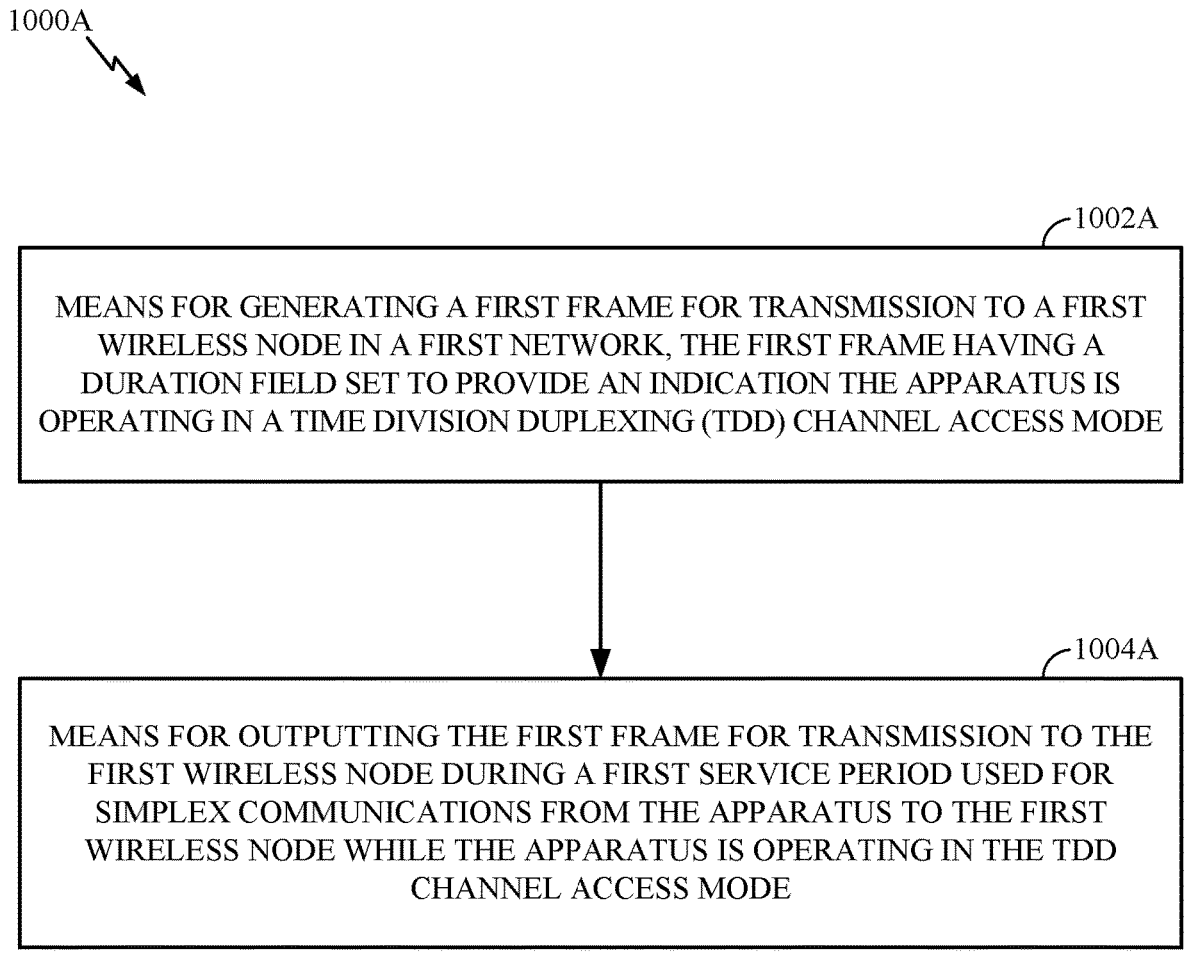
FIG. 10A illustrates example components capable of performing the operations shown in FIG. 10.

FIG. 10 illustrates an example of operations 1000 for indicating TDM access, in accordance with certain aspects of the present disclosure. Operations 1000 may be performed, for example, by a STA of a DN node.

Operations 1000 begin, at 1002, by generating a first frame for transmission to a first wireless node in a first network, the first frame having a duration field set to provide an indication the apparatus is operating in a time division duplexing (TDD) channel access mode. At 1004, the STA outputs the first frame for transmission to the first wireless node during a first service period used for simplex communications from the apparatus to the first wireless node while the apparatus is operating in the TDD channel access mode.

Figure 11:
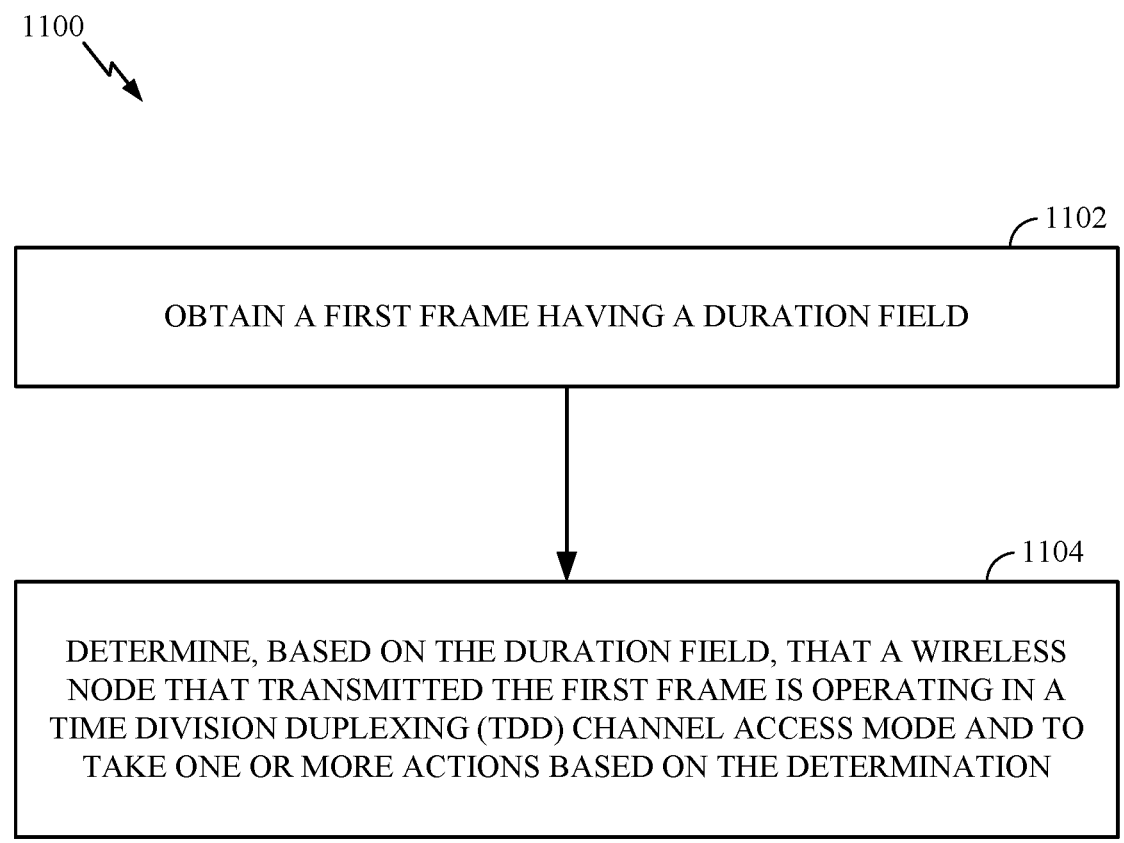
FIG. 11 illustrates an example of example operations for interpreting an indication of TDM access, in accordance with certain aspects of the present disclosure.
Figure 11A:
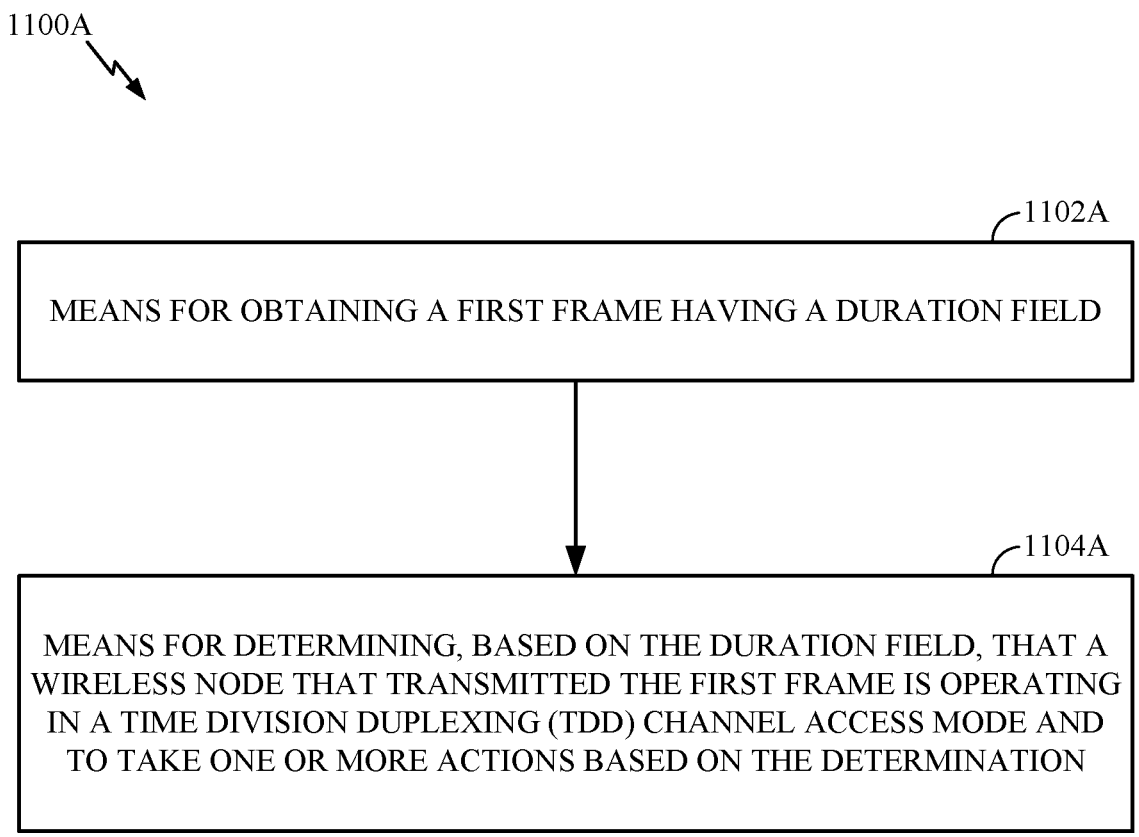
FIG. 11A illustrates example components capable of performing the operations shown in FIG. 11.

FIG. 11 illustrates an example of example operations 1100 for interpreting an indication of TDM access, in accordance with certain aspects of the present disclosure. Operations 1100 may be performed, for example, by a STA operating in an OBSS of a Distributed Network.

Operations 1100 begin, at 1102, by obtaining a first frame having a duration field. At 1104, the STA determines, based on the duration field, that a wireless node that transmitted the first frame is operating in a time division duplexing (TDD) channel access mode and to take one or more actions based on the determination.

In general, because each device is allocated dedicated service periods for simplex communications, there is no need for the duration field to be used for devices under TDM access. As described herein, however, the duration field may still be relevant for OBSS devices that are not using the TDM access and may be interfered by the TDM devices. In such cases, the duration field may be used to make the OBSS devices aware of the presence of the TDM devices.

FIGS. 12A and 12B illustrate two example options for indicating TDM access, in accordance with certain aspects of the present disclosure. As illustrated, each of the options may involve using a particular (e.g., previously reserved) combination of bit values of the duration field.

As illustrated in FIG. 12A, according to a first option, bits [0-13] of the duration field may still represent the duration and may be used to set NAV, while Bits [14, 15] may be set to 0 and 1, respectively, to indicate the frame is sent under TDM access. In this case, so-called legacy devices (e.g., 802.11ad devices) that are unaware of the encoding may interpret the Bit [15] as part of the duration and (because it is set to a 1) assert very high NAV value. In this manner, this approach may be considered an indirect indication of OBSS TDM access (even to legacy devices).

As illustrated in FIG. 12B, according to a second option, Bits [0-13] may all be set to zero and no NAV is set as a result. Bits [14, 15], on the other hand, may both be set to 1 to indicate the TDM access. This example encoding may have the same impact on legacy devices as in the first option described above, with legacy devices setting a high NAV based on Bits [14, 15].

Figure 13:
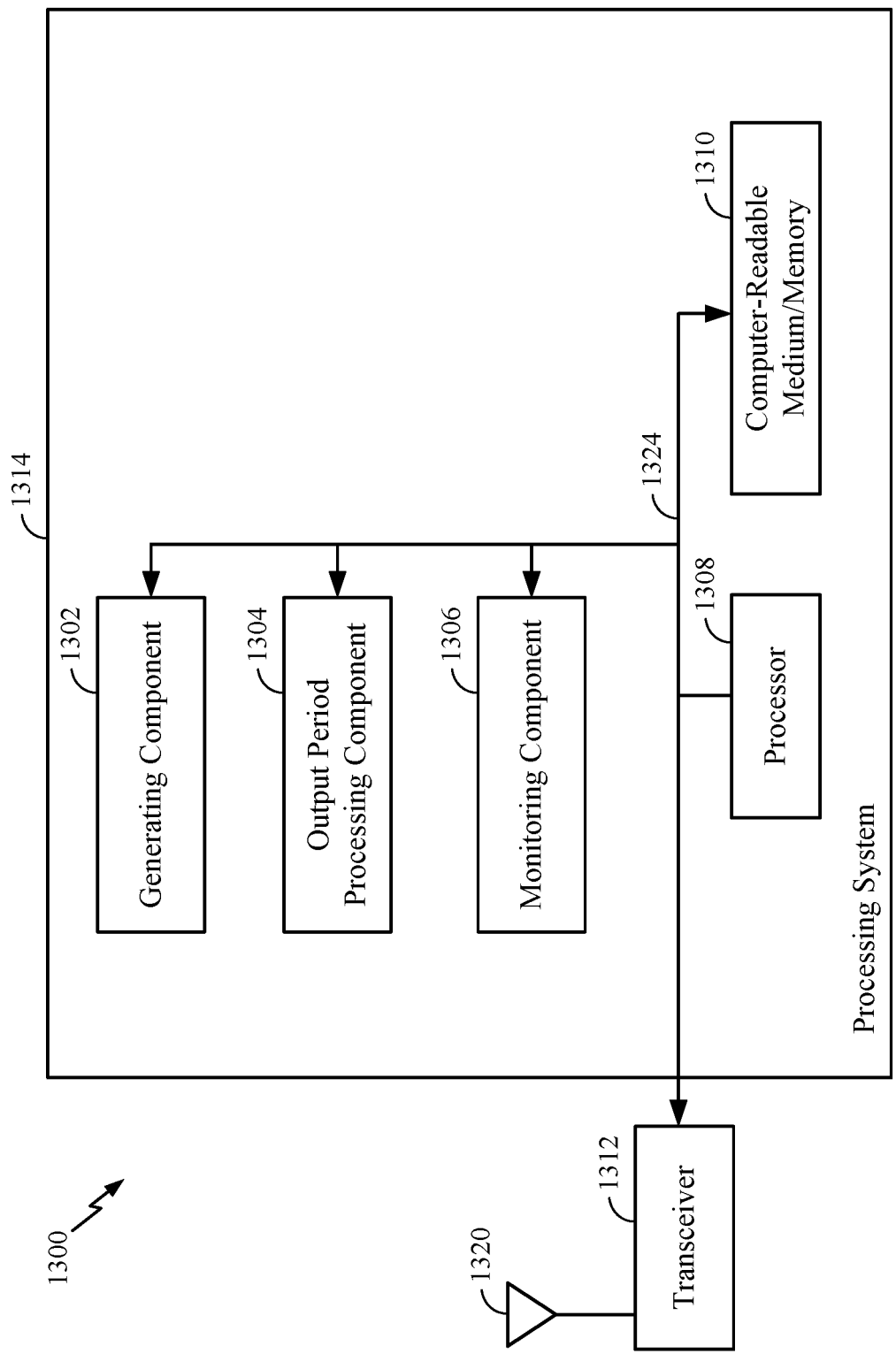
FIG. 13 illustrates a communications device that includes components capable of performing techniques described herein.

FIG. 13 illustrates a communications device 1300 that includes components (e.g., corresponding to means-plus-function components) capable of performing operations for the techniques described herein, such as the operations 700 illustrated in FIG. 7. The communications device 1300 includes a processing system 1314 coupled to a transceiver 1312. The transceiver 1312 is configured to transmit and receive signals for the communications device 1300 via an antenna 1320, such as the various signal described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1310 via a bus 1324. In certain aspects, the computer-readable medium/memory 1310 is configured to store instructions that when executed by processor 1308, cause the processor 1308 to perform the operations illustrated in FIG. 7, or other operations for performing the various techniques discussed herein. In certain aspects, the processing system 1314 further includes a generating component 1302 for performing the operations illustrated at 702 in FIG. 7. The processing system 1314 also includes an output period processing component 1304 for performing the operations illustrated at 704 in FIG. 7. The processing system 1314 also includes a monitoring component 1306 for performing the operations illustrated at 706 in FIG. 7.

The generating component 1302, output period processing component 1304, and monitoring component 1306 may be coupled to the processor 1308 via bus 1324. In certain aspects, the generating component 1302, output period processing component 1304, and monitoring component 1306 may be hardware circuits. In certain aspects, the generating component 1302, output period processing component 1304, monitoring component 1306 may be software components that are executed and run on processor 1308.

Figure 14:
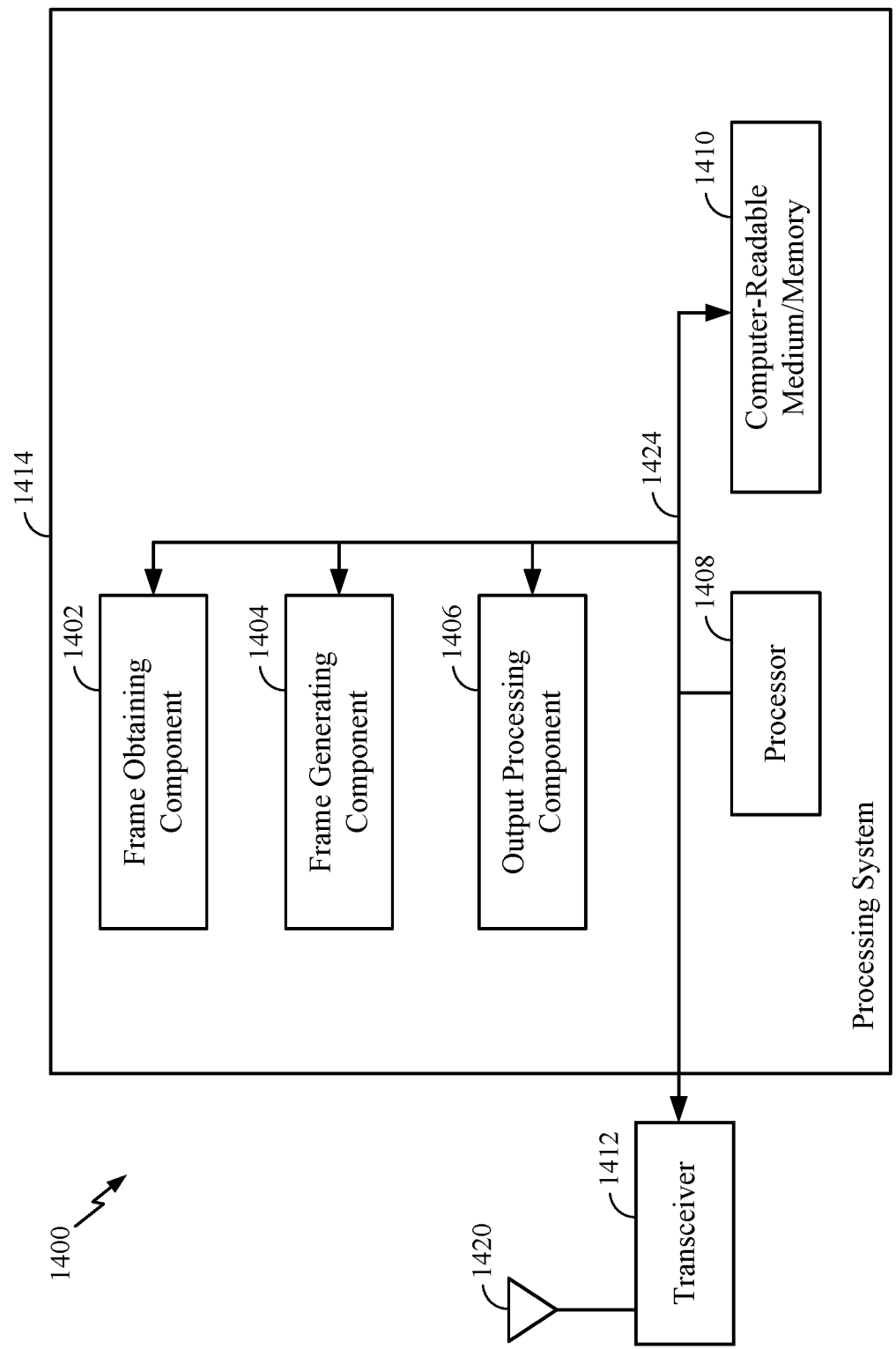
FIG. 14 illustrates a communications device that includes components capable of performing techniques described herein.

FIG. 14 illustrates a communications device 1400 that includes components (e.g., corresponding to means-plus-function components) capable of performing operations for the techniques described herein, such as the operations 800 illustrated in FIG. 8. The communications device 1400 includes a processing system 1414 coupled to a transceiver 1412. The transceiver 1412 is configured to transmit and receive signals for the communications device 1400 via an antenna 1420, such as the various signal described herein. The processing system 1414 may be configured to perform processing functions for the communications device 1400, including processing signals received and/or to be transmitted by the communications device 1400.

The processing system 1414 includes a processor 1408 coupled to a computer-readable medium/memory 1410 via a bus 1424. In certain aspects, the computer-readable medium/memory 1410 is configured to store instructions that when executed by processor 1408, cause the processor 1408 to perform the operations illustrated in FIG. 8, or other operations for performing the various techniques discussed herein. In certain aspects, the processing system 1414 further includes a frame obtaining component 1402 for performing the operations illustrated at 802 in FIG. 8. The processing system 1414 also includes a frame generating component 1404 for performing the operations illustrated at 804 in FIG. 8. The processing system 1414 also includes an output processing component 1406 for performing the operations illustrated at 806 in FIG. 8.

The frame obtaining component 1402, frame generating component 1404, and output processing component 1406 may be coupled to the processor 1408 via bus 1424. In certain aspects, the frame obtaining component 1402, frame generating component 1404, and output processing component 1406 may be hardware circuits. In certain aspects, the frame obtaining component 1402, frame generating component 1404, and output processing component 1406 may be software components that are executed and run on processor 1408.

Figure 15:
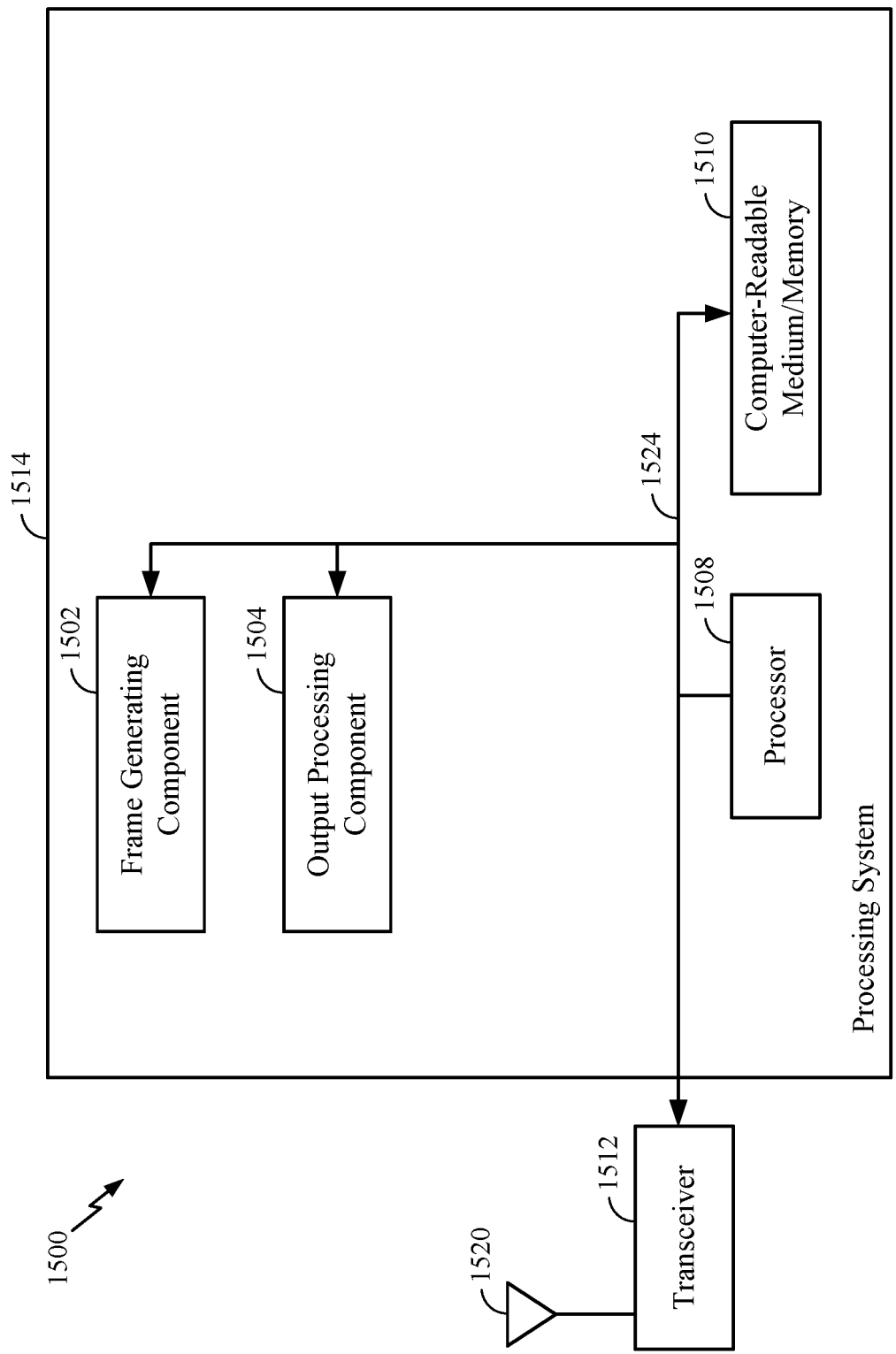
FIG. 15 illustrates a communications device that includes components capable of performing techniques described herein.

FIG. 15 illustrates a communications device 1500 that includes components (e.g., corresponding to means-plusfunction components) capable of performing operations for the techniques described herein, such as the operations 1000 illustrated in FIG. 10. The communications device 1500 includes a processing system 1514 coupled to a transceiver 1512. The transceiver 1512 is configured to transmit and receive signals for the communications device 1500 via an antenna 1520, such as the various signal described herein. The processing system 1514 may be configured to perform processing functions for the communications device 1500, including processing signals received and/or to be transmitted by the communications device 1500.

The processing system 1514 includes a processor 1508 coupled to a computer-readable medium/memory 1510 via a bus 1524. In certain aspects, the computer-readable medium/memory 1510 is configured to store instructions that when executed by processor 1508, cause the processor 1508 to perform the operations illustrated in FIG. 10, or other operations for performing the various techniques discussed herein. In certain aspects, the processing system 1514 further includes a frame generating component 1502 for performing the operations illustrated at 1002 in FIG. 10. The processing system 1514 also includes an output processing component 1504 for performing the operations illustrated at 1004 in FIG. 10.

The frame generating component 1502 and output processing component 1504 may be coupled to the processor 1508 via bus 1524. In certain aspects, the frame generating component 1502 and output processing component 1504 may be hardware circuits. In certain aspects, the frame generating component 1502 and output processing component 1504 may be software components that are executed and run on processor 1508.

Figure 16:
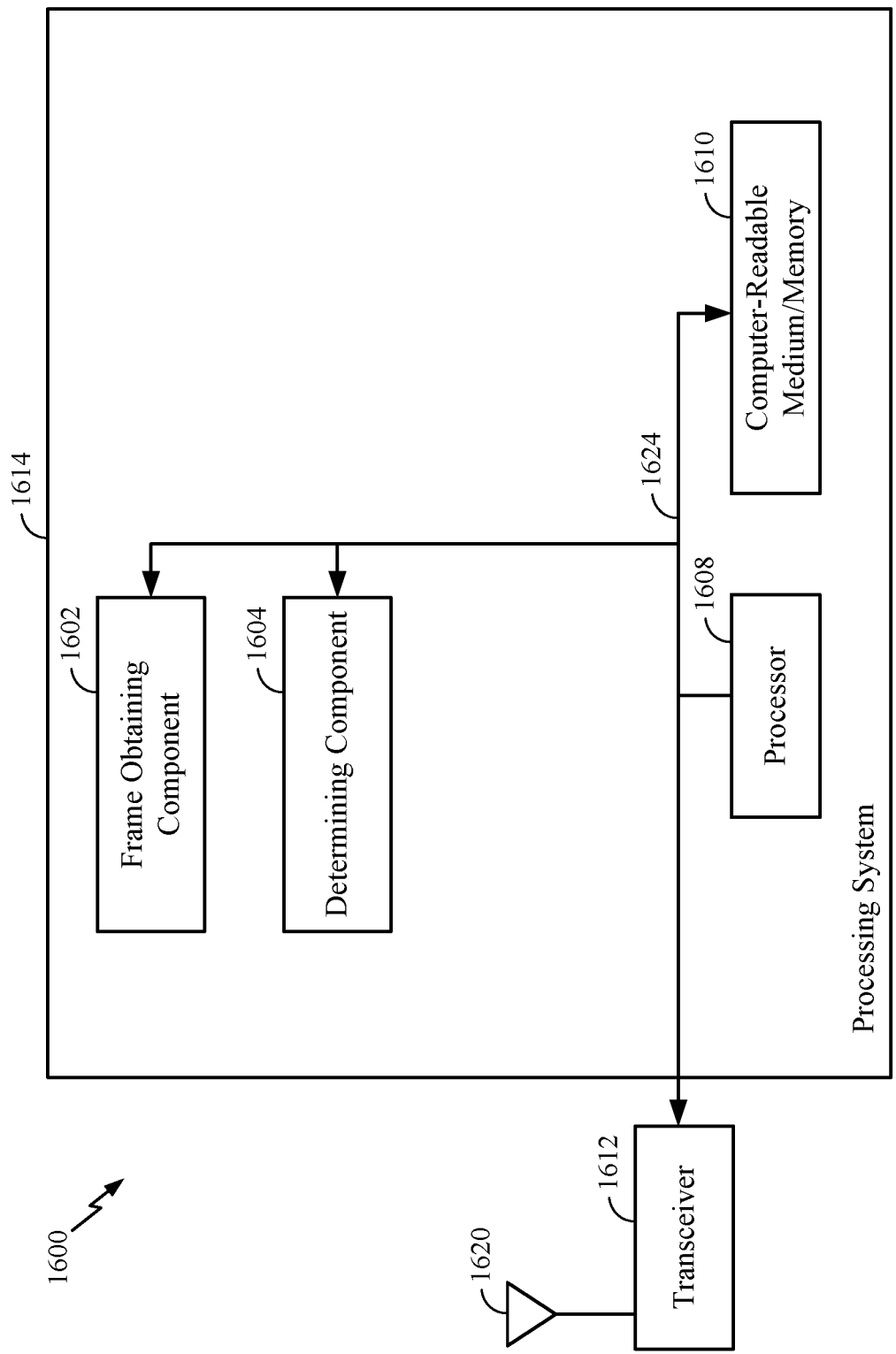
FIG. 16 illustrates a communications device that includes components capable of performing techniques described herein.

FIG. 16 illustrates a communications device 1600 that includes components (e.g., corresponding to means-plus-function components) capable of performing operations for the techniques described herein, such as the operations 1100 illustrated in FIG. 11. The communications device 1600 includes a processing system 1614 coupled to a transceiver 1612. The transceiver 1612 is configured to transmit and receive signals for the communications device 1600 via an antenna 1620, such as the various signal described herein. The processing system 1614 may be configured to perform processing functions for the communications device 1600, including processing signals received and/or to be transmitted by the communications device 1600.

The processing system 1614 includes a processor 1608 coupled to a computer-readable medium/memory 1610 via a bus 1624. In certain aspects, the computer-readable medium/memory 1610 is configured to store instructions that when executed by processor 1608, cause the processor 1608 to perform the operations illustrated in FIG. 11, or other operations for performing the various techniques discussed herein. In certain aspects, the processing system 1614 further includes a frame obtaining component 1602 for performing the operations illustrated at 1102 in FIG. 11. The processing system 1614 also includes a determining component 1604 for performing the operations illustrated at 1104 in FIG. 11.

The frame obtaining component 1602 and determining component 1604 may be coupled to the processor 1608 via bus 1624. In certain aspects, the frame obtaining component 1602 and determining component 1604 may be hardware circuits. In certain aspects, the frame obtaining component 1602 determining component 1604 may be software components that are executed and run on processor 1608.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means-plus-function components shown in FIGS. 7A, 8A, 10A, and 11A correspond to operations shown in FIGS. 7, 8, 10, and 11.

For example, means for obtaining may comprise a receiver (e.g., the receiver unit 222) and/or an antenna(s) 224 of the access point 110 or the receiver unit 254 and/or antenna(s) 254 of the user terminal 120 illustrated in FIG. 2. Means for outputting frames for transmission may comprise a transmitter (or other interface).

Means for generating, means for outputting, means for monitoring, means for obtaining, means for detecting, means for setting, and means for determining may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

In some cases, rather than separate interfaces, a single interface may be used to exchange frames with another device. For example, a single interface may be a transceiver with both transmit and receive functions (or functionality to both output frames for transmission and obtain frames).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for wireless communications, comprising:
a processing system configured to generate a first frame for transmission to a first wireless node in a first network, the first frame having a duration field set to provide an indication the apparatus is operating in a time division duplexing (TDD) channel access mode, wherein the duration field comprises a plurality of bits, including:
a first set of bits for setting a network allocation vector (NAV); and
a second set of bits that provide the indication that the apparatus is operating in the TDD channel access mode and that does not overlap with the first set of bits; and
a first interface configured to output the first frame for transmission to the first wireless node during a first service period used for simplex communications from the apparatus to the first wireless node while the apparatus is operating in the TDD channel access mode.

2. The apparatus of claim 1, wherein the duration field is decodable by a second wireless node of a second network that overlaps with the first network.

3. The apparatus of claim 1, wherein:
the first set of bits of the duration field is set to a value used for setting the NAV; and
the second set of bits of the duration field is set to a value to indicate the apparatus is operating in the TDD channel access mode.

4. The apparatus of claim 1, wherein:
the first set of bits of the duration field is set to a value to indicate the NAV is not to be set based on the first set of bits; and
the second set of bits of the duration field is set to a value to indicate the apparatus is operating in the TDD channel access mode.

5. An apparatus for wireless communications, comprising:
a first interface configured to obtain a first frame having a duration field, wherein the duration field comprises a plurality of bits, including:
a first set of bits for setting a network allocation vector (NAV); and
a second set of bits that provide an indication that the apparatus is operating in a time division duplexing (TDD) channel access mode and that does not overlap with the first set of bits; and
a processing system configured to determine, based on the duration field, that a wireless node that transmitted the first frame is operating in the TDD channel access mode and to take one or more actions based on the determination.

6. The apparatus of claim 5, wherein:
the wireless node is part of a first network; and
the apparatus is part of a second network that overlaps with the first network.

7. The apparatus of claim 6, wherein the one or more actions are designed to avoid interference from, or to avoid causing interference to, transmissions in the first network from wireless nodes operating in the TDD channel access mode.

8. The apparatus of claim 5, wherein the one or more actions comprise adjusting at least one of transmit or beamforming settings.

9. The apparatus of claim 5, wherein the determination that the wireless node is operating in the TDD channel access mode is based on the second set of bits of the duration field.

10. The apparatus of claim 5, wherein:
the processing system is further configured to set the NAV based on the first set of bits of the duration field.

11. A method for wireless communications, comprising:
generating a first frame for transmission to a first wireless node in a first network, the first frame having a duration field set to provide an indication that an apparatus is operating in a time division duplexing (TDD) channel access mode, wherein the duration field comprises a plurality of bits, including:
a first set of bits for setting a network allocation vector (NAV); and a second set of bits that provide the indication that the apparatus is operating in the TDD channel access mode and that does not overlap with the first set of bits; and outputting the first frame for transmission to the first wireless node during a first service period used for simplex communications from the apparatus to the first wireless node while the apparatus is operating in the TDD channel access mode.

12. The method of claim 11, wherein the duration field is decodable by a second wireless node of a second network that overlaps with the first network.

13. The method of claim 11, wherein:
the first set of bits of the duration field is set to a value used for setting the NAV; and
the second set of bits of the duration field is set to a value to indicate the apparatus is operating in the TDD channel access mode.

14. The method of claim 11, wherein:
the first set of bits of the duration field is set to a value to indicate the NAV is not to be set based on the first set of bits; and
the second set of bits of the duration field is set to a value to indicate the apparatus is operating in the TDD channel access mode.

15. A method for wireless communications, comprising:
obtaining a first frame having a duration field, wherein the duration field comprises a plurality of bits, including:
a first set of bits for setting a network allocation vector (NAV); and
a second set of bits that provide an indication that an apparatus is operating in a time division duplexing (TDD) channel access mode and that does not overlap with the first set of bits;
determining, based on the duration field, that a wireless node that transmitted the first frame is operating in the TDD channel access mode; and
taking one or more actions based on the determination.

16. The method of claim 15, wherein:
the wireless node is part of a first network; and
the apparatus is part of a second network that overlaps with the first network.

17. The method of claim 16, wherein the one or more actions are designed to avoid interference from, or to avoid causing interference to, transmissions in the first network from wireless nodes operating in the TDD channel access mode.

18. The method of claim 15, wherein the one or more actions comprise adjusting at least one of transmit or beamforming settings.

19. The method of claim 15, wherein the determination that the wireless node is operating in the TDD channel access mode is based on the second set of bits of the duration field.

20. The method of claim 15, further comprising:
setting the NAV based on the first set of bits of the duration field.

21. An apparatus for wireless communications, comprising:
means for generating a first frame for transmission to a first wireless node in a first network, the first frame having a duration field set to provide an indication that an apparatus is operating in a time division duplexing (TDD) channel access mode, wherein the duration field comprises a plurality of bits, including:
a first set of bits for setting a network allocation vector (NAV); and
a second set of bits that provide the indication that the apparatus is operating in the TDD channel access mode and that does not overlap with the first set of bits; and
means for outputting the first frame for transmission to the first wireless node during a first service period used for simplex communications from the apparatus to the first wireless node while the apparatus is operating in the TDD channel access mode.

22. The apparatus of claim 21, wherein the duration field is decodable by a second wireless node of a second network that overlaps with the first network.

23. The apparatus of claim 21, wherein:
the first set of bits of the duration field is set to a value used for setting the NAV; and
the second set of bits of the duration field is set to a value to indicate the apparatus is operating in the TDD channel access mode.

24. The apparatus of claim 21, wherein:
the first set of bits of the duration field is set to a value to indicate the NAV is not to be set based on the first set of bits; and
the second set of bits of the duration field is set to a value to indicate the apparatus is operating in the TDD channel access mode.

25. An apparatus for wireless communications, comprising:
means for obtaining a first frame having a duration field, wherein the duration field comprises a plurality of bits, including:
a first set of bits for setting a network allocation vector (NAV); and
a second set of bits that provide an indication that an apparatus is operating in a time division duplexing (TDD) channel access mode and that does not overlap with the first set of bits;
means for determining, based on the duration field, that a wireless node that transmitted the first frame is operating in the TDD channel access mode; and
means for taking one or more actions based on the determination.

26. The apparatus of claim 25, wherein:
the wireless node is part of a first network; and
the apparatus is part of a second network that overlaps with the first network.

27. The apparatus of claim 26, wherein the means for taking the one or more actions are designed to avoid interference from, or to avoid causing interference to, transmissions in the first network from wireless nodes operating in the TDD channel access mode.

28. The apparatus of claim 25, wherein the means for taking the one or more actions comprise means for adjusting at least one of transmit or beamforming settings.

29. The apparatus of claim 25, wherein the means for determining that the wireless node is operating in the TDD channel access mode is based on the second set of bits of the duration field.

30. The apparatus of claim 25, further comprising:
means for setting the NAV based on the first set of bits of the duration field.

* * * * *